United States Patent [19]
Ciali

[11] Patent Number: 5,165,157
[45] Date of Patent: Nov. 24, 1992

[54] DIPSTICK TUBE INSERTION AND REMOVAL TOOL APPARATUS

[76] Inventor: Ronald R. Ciali, 312 Cardinal Dr., Larksville, Pa. 18704

[21] Appl. No.: 791,343

[22] Filed: Nov. 14, 1991

[51] Int. Cl.$^5$ ............................................. B25B 27/14
[52] U.S. Cl. ...................................................... 29/275
[58] Field of Search .................. 29/275, 254, 255, 267; 81/490

[56] References Cited

U.S. PATENT DOCUMENTS

| | | | |
|---|---|---|---|
| 298,649 | 5/1884 | Yingling et al. | 81/490 |
| 1,928,841 | 10/1933 | Morse | 29/275 |
| 2,089,902 | 8/1937 | Kulp | 29/275 |
| 3,228,269 | 1/1966 | Heyer | 29/275 |
| 4,354,375 | 10/1982 | Lesowsky | 29/267 |
| 4,817,274 | 4/1989 | Higgins | 29/267 |

*Primary Examiner*—Robert C. Watson
*Attorney, Agent, or Firm*—Leon Gilden

[57] ABSTRACT

An insertion tool to project a reduced diameter lower portion of a dipstick tube into an internal combustion engine is formed to include elongate, cylindrical tube formed with an enclosed slot directed through a side wall thereof. The side wall receives the dipstick tube therethrough in the use of an arcuate dipstick tube, wherein the cylindrical tube permits the sliding reception of a coaxially aligned dipstick tube, wherein the tube structure includes a removable and securable plug of rigid construction of an upper terminal end of the tool to receive impact and direct the dipstick tube into the engine. A removal tool includes a lower flange plate formed with a serrated "V" shaped notch engageable about a dipstick tube, with the flange plate including a rod and the rod formed with a lever at its upper end to permit the lifting of the flange plate and the dipstick tube upon rotation of the lever.

2 Claims, 4 Drawing Sheets

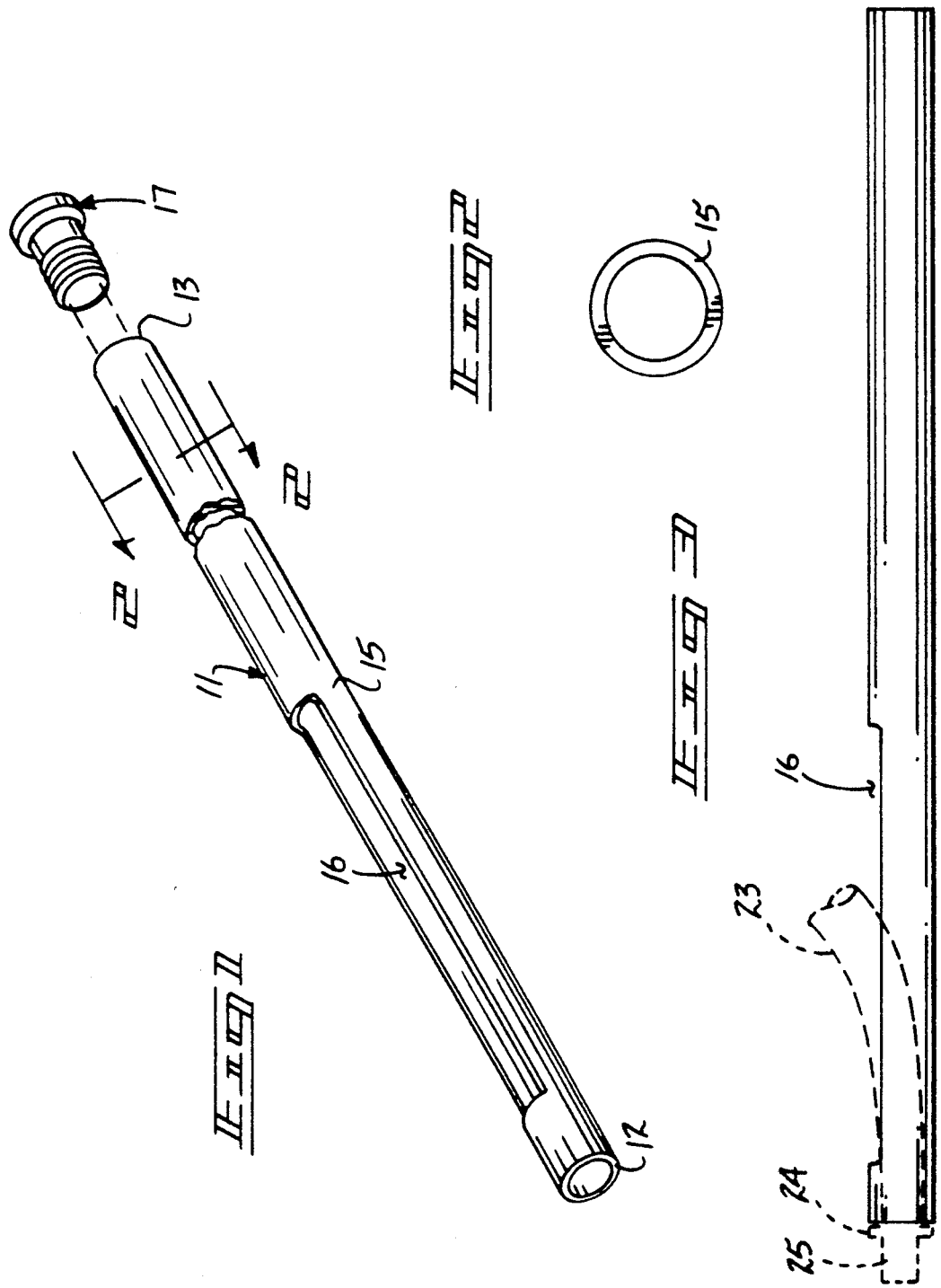

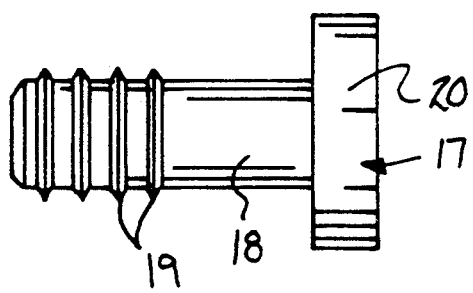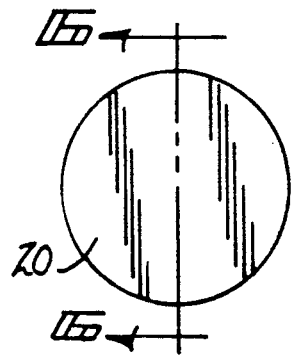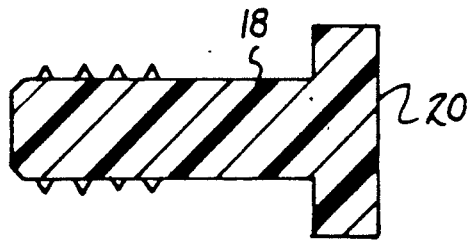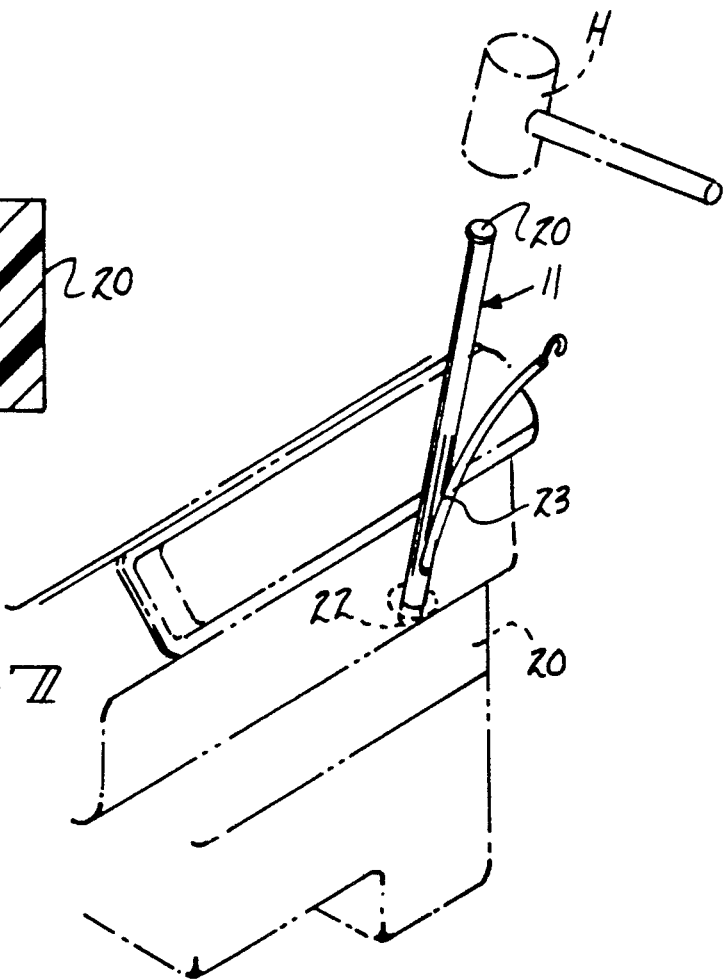

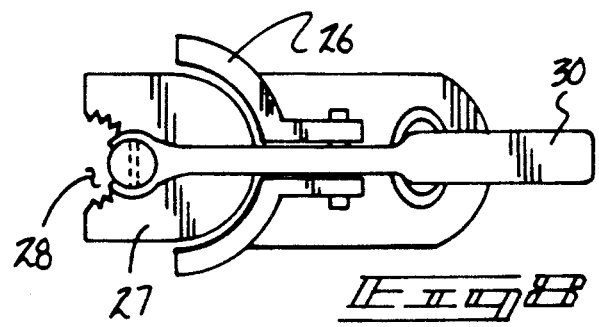
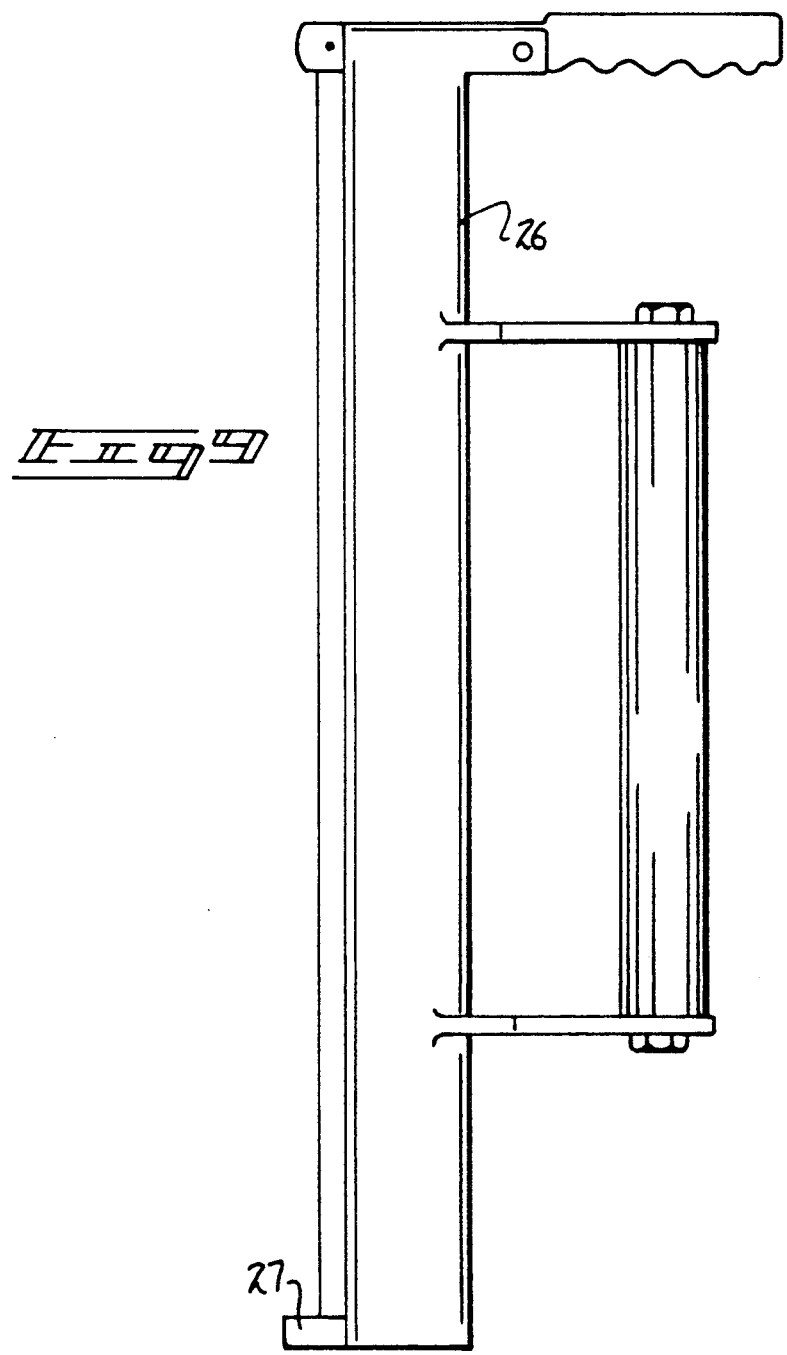

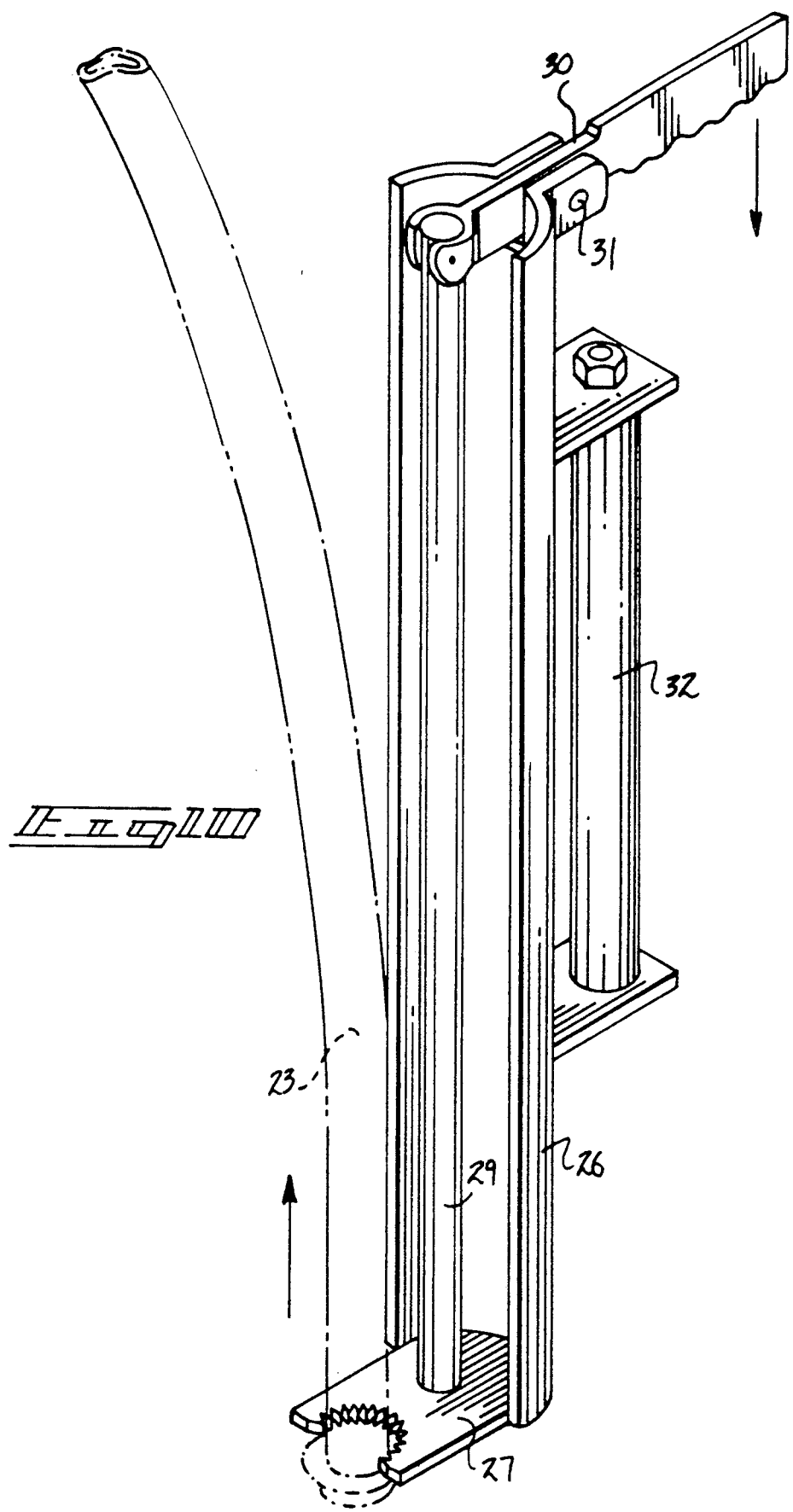

DIPSTICK TUBE INSERTION AND REMOVAL TOOL APPARATUS

BACKGROUND OF THE INVENTION

1. Field of the Invention

The field of invention relates to assembly apparatus, and more particularly pertains to a new and improved dipstick tube insertion and removal tool apparatus wherein the same is arranged to provide guidance for a dipstick tube to projected into an internal combustion engine.

2. Description of the Prior Art

Typical dipstick tubes as utilized in internal combustion engines are formed with thin wall tubing. This tubing precludes direct impact thereon as such tubing is subject to distortion, bending, and the like rending the dipstick tube inoperative for use. The prior art has not properly addressed the manner of insertion of a dipstick tube relative to an internal combustion engine, wherein prior art structure is exemplified in U.S. Pat. No. 4,894,926 to Suhr; U.S. Pat. No. 4,761,886 to Wilson, et al.; U.S. Pat. No. 4,266,344 to Richardson; and U.S. Pat. No. 4,301,597 to Midorikawa are various examples of dipstick tube structure and guidance for directing a dipstick member into an associated tube.

As such, it may be appreciated that there continues to be a need for a new and improved dipstick tube insertion and removal tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of dipstick tube insertion apparatus now present in the prior art, the present invention provides a dipstick tube insertion and removal tool apparatus wherein the same is arranged to effect projection and directing of a dipstick tube into an associated internal combustion engine minimizing damage to the dipstick tube structure. As such, the general purpose of the present invention, which will be described subsequently in greater detail, is to provide a new and improved dipstick tube insertion and removal tool apparatus which has all the advantages of the prior art assembly apparatus and none of the disadvantages.

To attain this, the present invention provides an insertion tool to project a reduced diameter lower portion of a dipstick tube into an internal combustion engine formed to include elongate, cylindrical tube formed with an enclosed slot directed through a side wall thereof. The side wall receives the dipstick tube therethrough in the use of an arcuate dipstick tube, wherein the cylindrical tube permits the sliding reception of a coaxially aligned dipstick tube, wherein the tube structure includes a removable and securable plug of rigid construction of an upper terminal end of the tool to receive impact and direct the dipstick tube into the engine. A removal tool includes a lower flange plate formed with a serrated "V" shaped notch engageable about a dipstick tube, with the flange plate including a rod and the rod formed with a lever at its upper end to permit the lifting of the flange plate and the dipstick tube upon rotation of the lever.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will apreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dipstick tube insertion and removal tool apparatus which has all the advantages of the prior art assembly apparatus and none of the disadvantages.

It is another object of the present invention to provide a new and improved dipstick tube insertion and removal tool apparatus which may be easily and efficiently manufactured and marketed.

It is a further object of the present invention to provide a new and improved dipstick tube insertion and removal tool apparatus which is of a durable and reliable construction.

An even further object of the present invention is to provide a new and improved dipstick tube insertion and removal tool apparatus which is susceptible of a low cost of manufacture with regard to both materials and labor, and which accordingly is then susceptible of low prices of sale to the consuming public, thereby making such dipstick tube insertion and removal tool apparatus economically available to the buying public.

Still yet another object of the present invention is to provide a new and improved dipstick tube insertion and removal tool apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a view taken along the lines 2—2 of FIG. 1 in the direction indicated by the arrows.

FIG. 3 is an orthographic side view of the instant invention.

FIG. 4 is an orthographic side view of the impact plug structure utilized by the invention.

FIG. 5 is an orthographic top view of the plug head, as illustrated in FIG. 4.

FIG. 6 is an orthographic view, taken along the lines 6—6 of FIG. 5 in the direction indicated by the arrows.

FIG. 7 is an isometric illustration of the assembly tube structure in use.

FIG. 8 is an orthographic top view of a dipstick removal tool.

FIG. 9 is an orthographic side view of the dipstick removal tool.

FIG. 10 is an isometric illustration of the dipstick removal tool mounted relative to an associated dipstick tube.

DESCRIPTION OF THE PREFERRED EMBODIMENT

With reference now to the drawings, and in particular to FIGS. 1 to 10 thereof, a new and improved dipstick tube insertion and removal tool apparatus embodying the principles and concepts of the present invention and generally designated by the reference numerals 11–32 will be described.

More specifically, the dipstick tube insertion and removal tool apparatus essentially comprises, with reference to the FIGS. 1–7, a rigid cylindrical tube 11 formed by a constant predetermined internal diameter. The tube 11 includes a tube lower distal end 12 spaced from a tube upper distal end 13. A tube cylinder side wall 15 is thereby defined by the tube 11 and includes an enclosed side wall slot 16 directed through the cylindrical tube 11 arranged parallel to an axis defined by the tube 11. It should be noted that the enclose slot 16 should be defined by a width substantially equal to or greater than the predetermined internal diameter of the tube 11 to permit projection of the dipstick tube 23 therethrough. An impact receiving plug 17 is arranged for mounting into the tube upper distal end 13. The impact receiving plug 17, as well as the cylindrical tube 11 are each formed of a rigid construction to accommodate impact. The plug 17 includes a rigid cylindrical body 18 defined by an external diameter substantially equal to a predetermined internal diameter defined by the tube 11. An impact receiving head 20 is orthogonally mounted relative to an upper terminal end of the cylindrical body 18. A plurality of spaced parallel flexible engagement ribs 19 are mounted about the cylindrical body 18 below the head 20 to ensure engagement within the tube 11 during use preventing inadvertent displacement of the plug 17 relative to the tube 11 during impact directing hammer "H" onto the impact receiving head 20. An engine block 21 is formed to provide for an engine tube receiving bore 22, such as illustrated in the FIG. 7. The dipstick tube 23, such as exemplified in phantom in FIG. 3, is formed with an arcuate generally cylindrical body 23 formed with a flange 24 at an interface between the tube 23 and a reduced lower end portion 25 to be received within the tube receiving bore 22 of the engine block. It is the flange 24 that is in contiguous communication with the tube lower distal end 12 receiving impact and thereby eliminating impact to the tube structure itself of the dipstick tube preventing its distortion during insertion relative to the engine block.

A disassembly tool, such as illustrated in the FIGS. 8–10, is provided formed with a semi-cylindrical tube member 26 including a lower flange 27 orthogonally oriented relative to the tube and slidably received therewithin. The tube member lower flange 27 includes a serrated "V" shaped slot 28 directed into the flange diametrically opposed to a handle member 32 mounted medially to a rear surface of the tube member 26. The serrated "V" shaped slot 28 receives the dipstick tube therewithin, as illustrated in FIG. 10. A rod 29 fixedly and orthogonally mounted to a lower flange 27 projects upwardly relative to the tube member within the semi-cylindrical tube member and its upper terminal end is pivotally mounted to a lever member 30. The lever member 30 includes a pivot axle 31 mounted at the upper terminal end of the tube member 26. Upon rotation of the lever member 30, lifting of the rod and associated flange plate 27 is provided to effect lifting of the associated dipstick tube 23 in a disassembly procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dipstick tube insertion tool for projecting a dipstick tube into a receiving bore, wherein the dipstick tube includes a generally cylindrical body, including a flange spaced from a lower distal end of the cylindrical body, and a reduced diameter portion positioned below the flange arranged for reception within the bore, wherein the tool comprises, a rigid cylindrical tube defined by a predetermined internal diameter, the tube including a tube lower distal end and a tube upper distal end coaxially aligned relative to one another, and the tube including a tube cylindrical side wall, and an enclosed side wall slot directed through the side wall between the lower distal end and the upper distal end, and the slot is defined by a width at least equal to the predetermined internal diameter, and an impact receiving plug received within the upper distal end, the impact receiving plug including a rigid cylindrical body defined by an external diameter substantially equal to the predetermined internal diameter and including a plurality of spaced parallel flexible annular engagement ribs mounted about the cylindrical body for securement of the cylindrical body within the tube, and the plug further including impact receiving head defined by a planar top surface orthogonally oriented relative to the cylindrical body.

2. A dipstick tube insertion tool for projecting a dipstick tube into a receiving bore, wherein the dipstick tube includes a generally cylindrical body, including a flange spaced from a lower distal end of the cylindrical body, and a reduced diameter portion positioned below the flange arranged for reception within the bore, wherein the tool comprises, a rigid cylindrical tube defined by a predetermined internal diameter, the tube including a tube lower distal end and a tube upper distal end coaxially aligned relative to one another, and the tube including a tube cylindrical side wall, and an enclosed side wall slot directed through the side wall between the lower distal end and the upper distal end, and the slot is defined by a width at least equal to the predetermined internal diameter, and an impact receiving plug received within the upper distal end, the impact receiving plug including a rigid cylindrical body defined by an external diameter substantially equal to the predetermined internal diameter and including a plurality of spaced parallel flexible annular engagement ribs mounted about the cylindrical body for securement of the cylindrical body within the tube, and the plug further including impact receiving head defined by a planar top surface orthogonally oriented relative to the cylindrical body, and a semi-cylindrical tube member, the tube member coaxially aligned and including a lower distal end and an upper distal end, and a flange slidably received within the tube member projecting interiorly of the tube member and oriented orthogonally relative to an axis defined by the tube member, and a handle member mounted to an exterior surface of the tube member, and a serrated "V" shaped slot directed into the flange diametrically opposed to the handle member, and the flange including a rigid rod orthogonally mounted to an upper surface of the flange projecting coaxially aligned with the tube member, wherein the rod includes a rod upper distal end, the rod upper distal end fixedly mounted to a forward terminal end of a lever member, the lever member pivotally mounted to the tube member upper distal end, whereupon rotation of the lever member effects lifting of the flange.

* * * * *